United States Patent [19]

Stevenson, Jr. et al.

[11] Patent Number: 4,471,876
[45] Date of Patent: Sep. 18, 1984

[54] POTATO CLEANING TABLE

[75] Inventors: John Stevenson, Jr., Cambridge; Glen D. Paulson, Braham, both of Minn.; Merlyn V. Collette, Grafton, N. Dak.

[73] Assignee: NFD, Inc., Braham, Minn.

[21] Appl. No.: 216,931

[22] Filed: Dec. 16, 1980

[51] Int. Cl.³ .............................................. B07C 5/36
[52] U.S. Cl. ................................. 209/618; 15/3.11; 198/592; 209/673
[58] Field of Search ............... 198/659, 664, 666, 592, 198/593; 209/635, 692, 669, 667, 668, 670, 673, 671, 618, 672, 242; 171/10, 12, 15, 18, 116, 133, 50, 58; 15/3.11

[56] References Cited

U.S. PATENT DOCUMENTS

| | | | |
|---|---|---|---|
| 483,225 | 9/1892 | Lampitt . | |
| 746,704 | 12/1903 | Hovey . | |
| 1,347,215 | 7/1920 | Eby . | |
| 1,420,062 | 6/1922 | Skinner . | |
| 1,466,015 | 8/1923 | Hartley et al. . | |
| 1,509,447 | 9/1924 | Skinner . | |
| 1,832,035 | 11/1931 | Leib | 209/669 X |
| 2,139,318 | 12/1938 | Sibille | 146/193 |
| 2,173,414 | 9/1939 | Fulton | 198/664 |
| 2,209,268 | 7/1940 | Gouinlock et al. | 209/615 |
| 2,213,489 | 9/1940 | Durand | 146/202 |
| 2,357,892 | 9/1944 | Grant | 146/198 |
| 2,531,379 | 11/1950 | Chickering | 55/9 |
| 2,553,310 | 5/1951 | Gransden | 198/592 X |
| 2,604,206 | 7/1952 | Armer . | |
| 2,608,815 | 9/1952 | Graaff | 55/106 |
| 2,618,385 | 11/1952 | Silver et al. | 209/107 |
| 2,624,458 | 1/1953 | Molnau | 209/107 |
| 2,877,475 | 3/1959 | Henry | 15/3.11 |
| 2,991,882 | 7/1961 | Duplantis et al. | 209/77 |
| 2,997,086 | 8/1961 | Armer | 146/85 |
| 3,108,691 | 10/1963 | Vance | 209/668 |
| 3,117,671 | 1/1964 | Pearce et al. | 209/671 |
| 3,217,346 | 11/1965 | Silver et al. | 15/3.11 |
| 3,367,494 | 2/1968 | Peterson | 209/668 |
| 3,399,766 | 9/1968 | Rollins | 209/107 |
| 3,451,084 | 6/1949 | Silver | 15/3.11 |
| 3,473,658 | 10/1969 | Bartlett, Jr. | 209/618 |
| 3,721,345 | 3/1973 | Brown et al. | 209/107 |
| 3,722,673 | 3/1973 | Bedwell et al. | 209/692 |
| 3,750,211 | 8/1973 | Zaun et al. | 15/3.11 |
| 3,794,161 | 8/1974 | Peterson . | |
| 4,049,058 | 9/1977 | Eisenhardt et al. | 171/58 |
| 4,120,363 | 10/1978 | Ernst | 171/58 |

FOREIGN PATENT DOCUMENTS

| | | | |
|---|---|---|---|
| 621858 | 6/1961 | Canada | 209/669 |
| 2157441 | 5/1973 | Fed. Rep. of Germany | 209/669 |

Primary Examiner—Robert B. Reeves
Assistant Examiner—Donald Hajec
Attorney, Agent, or Firm—Burd, Bartz & Gutenkauf

[57] ABSTRACT

A cleaning table for sorting newly harvested potatoes or other vegetables from vines, dirt, clods, rocks and other debris. The table includes a deck comprised of a plurality of spaced apart, parallel longitudinal rollers that operate in pairs of counterrotating rollers which rotate toward one another when viewed from the top. The rollers are formed of an elastically deformable material such as rubber, soft plastic or the like. One of each pair of rollers can have an elongate helical rib or flight extending from end to end. As potatoes and associated debris move longitudinally along the rollers, the dirt, vines, clods and other debris are separated from the potatoes and fall between the spaces between the rollers. Hard objects pass between the rollers without damage to the rollers.

14 Claims, 12 Drawing Figures

POTATO CLEANING TABLE

SUMMARY OF THE INVENTION

The invention pertains to a table for cleaning vegetables such as potatoes by separating the vegetables from dirt, vines, clods, rocks and like trash or debris that is lifted from the ground with the vegetable. Potatoes and like vegetables present a unique problem upon harvest because they are well rooted in the ground and are lifted from the ground with considerable quantity of stem, dirt, clods, rocks and other such debris. In addition, potatoes are fragile and must be handled carefully upon separation from the trash.

The invention comprises a cleaning table for sorting newly lifted potatoes from vines, dirt, clods, rocks and other trash. The table includes a deck comprised of a plurality of spaced apart, parallel longitudinal rollers. The rollers operate in pairs of counter rotating rollers which rotate toward one another when viewed from the top. The rollers are formed of an elastically deformable material such as rubber, soft plastic or the like. One of each pair of rollers has an elongate helical rib or flight extending from end to end. The other roller can be smooth or can have a corresponding helical rib or can be formed with straight longitudinal ribs. The table is disposed with the rollers at a longitudinal inclination. Newly harvested potatoes, along with the corresponding trash, are deposited on the upper end of the table. The potatoes travel down the table toward the lower end. Under the influence of the rotating rollers, the vines, trash, clods, rocks and the like are separated from the potatoes and fall through the spaces between the rollers. The helical ribs advance the potatoes and break up dirt clumps and other debris to force it between the rollers while moving the potatoes off the end of the table. The soft covering of the rollers prevents damage to the potatoes. Rocks which pass through the spaces between the rollers do not damage the rollers.

IN THE DRAWINGS

FIG. 4 is an enlarged end elevational view of the cleaning table of FIG. 1 partly in section and taken along the line 4—4 of FIG. 1;

FIG. 11 is a fragmentary view of an alternative embodiment of a roller for use in the cleaning table of the invention; and;

DESCRIPTION OF PREFERRED EMBODIMENTS

Figure 1:
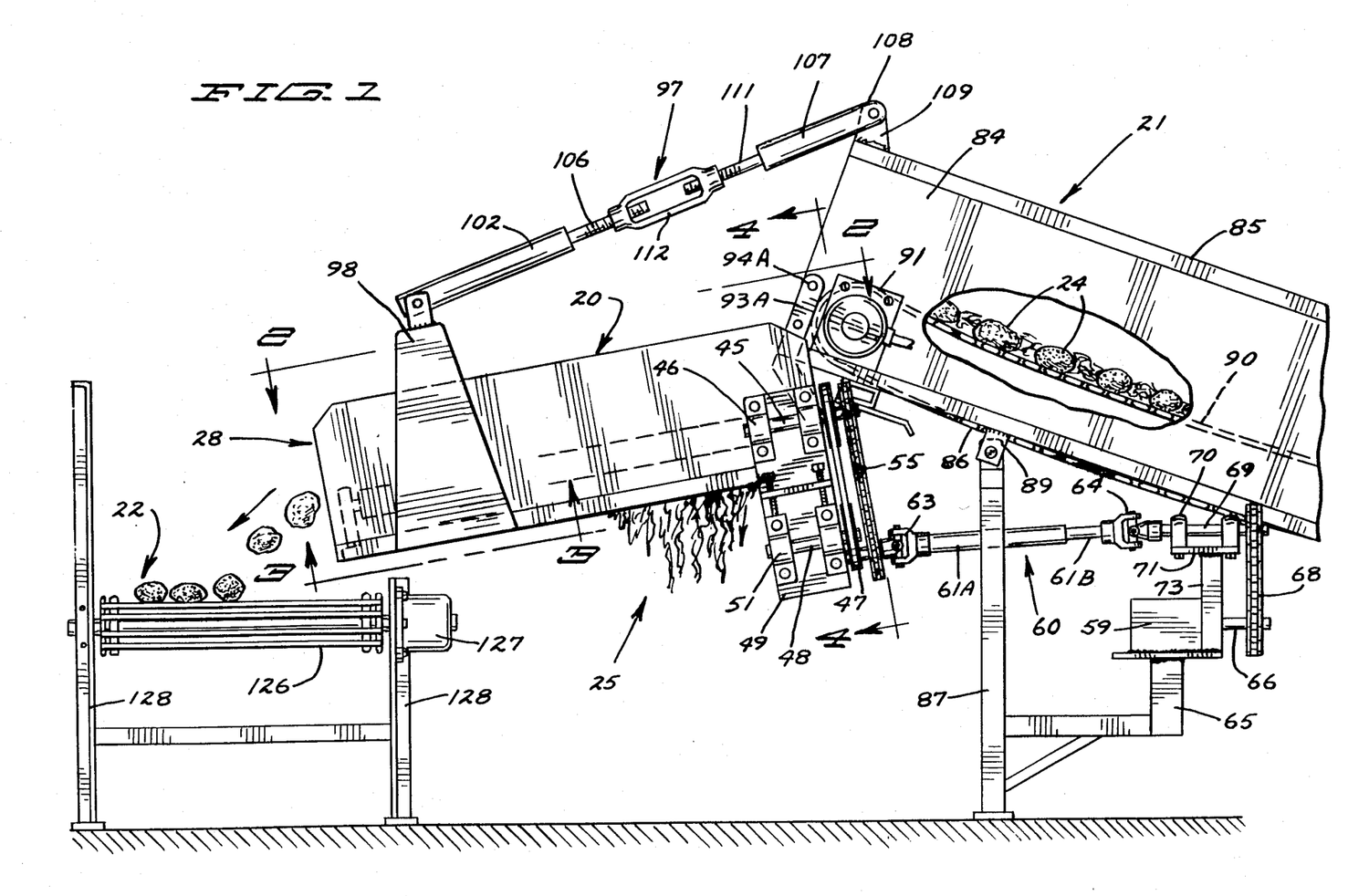
FIG. 1 is a side elevational view of a cleaning table of the invention positioned with respect to an input conveyor at one end and an output conveyor at the opposite end.

Referring to the drawings, there shown in FIG. 1 a cleaning table 20 according to the invention installed for receipt of potatoes from an input elevator or conveyor 21 and poised for discharge of potatoes to an output conveyor or spud chain conveyor 22. Potatoes 24 along with associated debris 25 such as vines, dirt, rocks, clods and the like travel along input conveyor 21 and are deposited on cleaning table 20. The potatoes travel along the cleaning table 20 and are discharged at the opposite end thereof onto output conveyor 22. Associated debris and trash 25 are eliminated along the length of table 20.

Table 20 includes a frame having a lateral forward frame member 26 and a lateral rear frame member 27 (see FIGS. 2 and 4), and longitudinal sidewalls 28, 29. The lower edges 31 of the sidewalls 28, 29 are comprised as outwardly extended upwardly open channels and are connected at their respective forward and rearward edges to the outer ends of the forward and rearward members 26, 27 by suitable means such as welding. Sidewalls 28, 29 present upstanding side surfaces for cleaning table 20 to prevent spillage of potatoes as they travel longitudinally along the table.

Figures 2, 3:
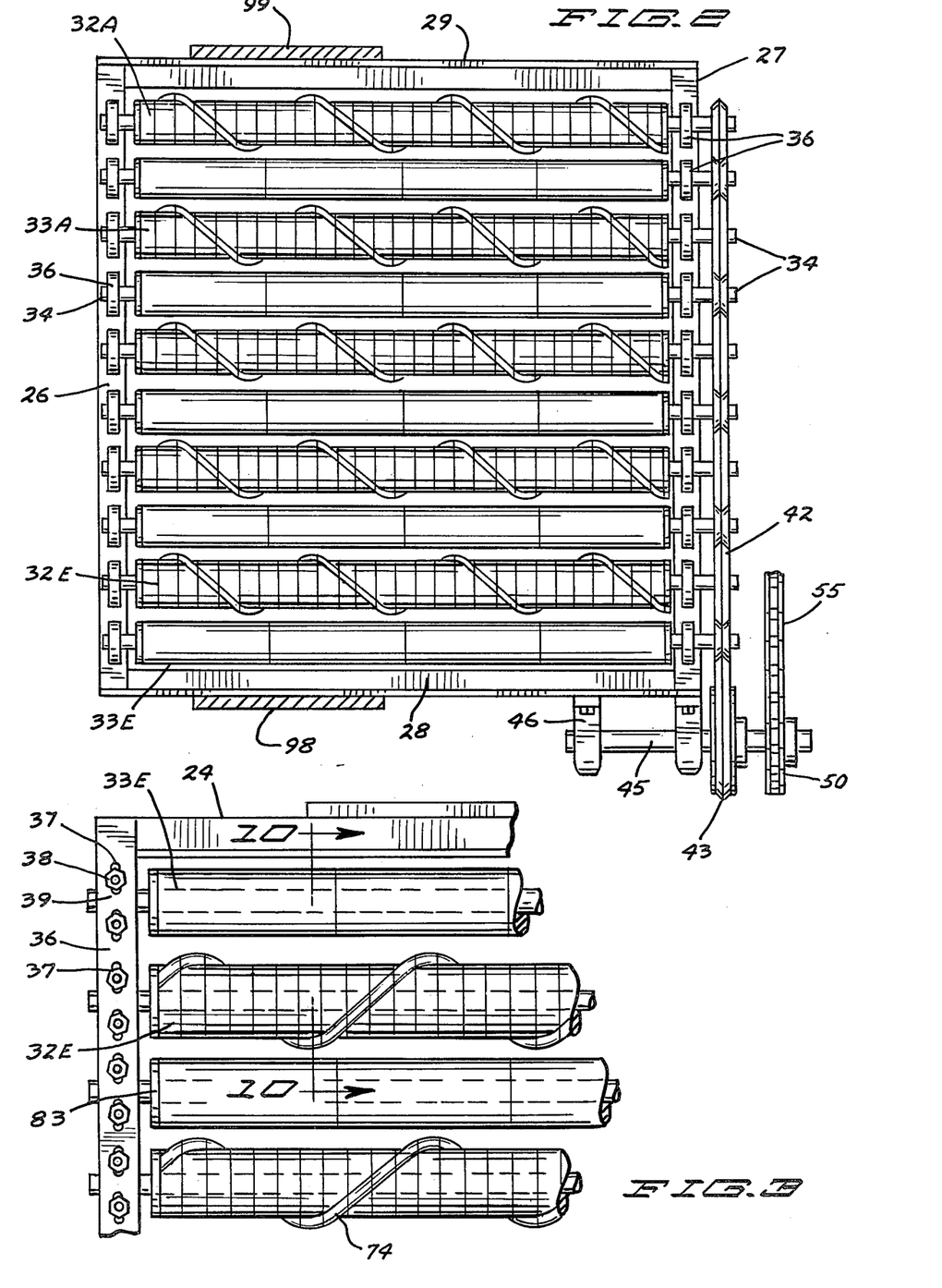
FIG. 2 is an enlarged top elevational view of the cleaning table of FIG. 1 partly in section and taken along the line 2—2 of FIG. 1.
FIG. 3 is an enlarged bottom elevational view of a portion of the cleaning table of FIG. 1 taken along the line 3—3 of FIG. 1.
Figure 2:
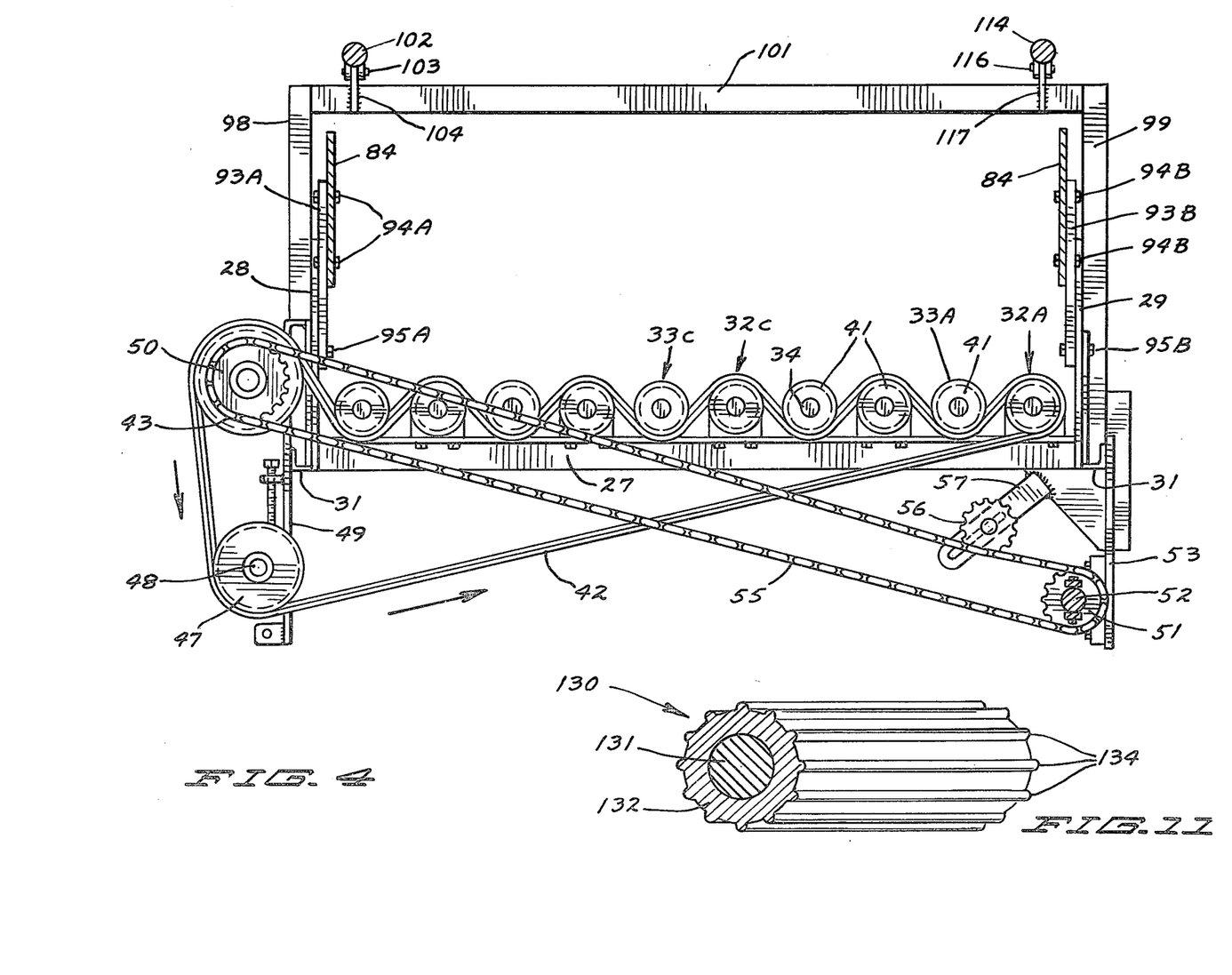

A plurality of cleaning rollers extend longitudinally between forward and rear frame members 26, 27 and laterally between the sidewalls 28, 29. The rollers are assembled in coplanar relationship and are disposed in pairs of first and second rollers 32, 33. As shown in FIG. 2, there are five such pairs of rollers 32A, 33A through 32E, 33E. The rollers of each pair are counterrotating or rotate toward one another as viewed from the top. Roller support means for each roller is comprised as a central, axial roller shaft 34. The forward and rearward ends of each roller shaft 34 are rotatably mounted in bearing blocks 36 mounted respectively on the forward frame member 26 and the rearward frame member 27. The bearing blocks 36 are adjustably mounted on the forward and rearward frame members 26, 27 for limited lateral adjustment to vary the space between the rollers of each pair. As shown in FIG. 3, forward frame member 26 has a plurality of elongate mounting slots 37. Mounting bolts 38 extend downward from bearing blocks 36 through the mounting slots 27 and are secured by nuts 39. Loosening of the nuts 39 permits some measure of lateral adjustment of the location of the mounting block 36 and the corresponding roller held by the bearing block 36. Spacing between corresponding rollers of each pair can be varied as desired and according to conditions of potatoes or other vegetables being cleaned on the table.

Power means are provided to counterrotate the pairs of rollers 32, 33. Roller shafts 34 extend rearwardly beyond the rear frame member 27. The rearward end of each roller shaft 34 is equipped with a circumferencially grooved roller pulley 41. As shown in FIG. 4, an endless loop roller drive belt 42 is comprised as a double V belt trained along the grooves of the roller pulleys 41.

Endless loop belt 42 is trained about a roller belt drive pulley 43 mounted on a shaft 45 rotatably fixed to sidewall 28 by clamps 46 (See FIGS. 1 and 2). Belt 42 is also trained about an idler pulley 47 mounted on a shaft 48 located beneath the drive pulley 43 and rotatably mounted to a plate 49 by clamps 51. Plate 49 is affixed to the lower edge of sidewall 28 extending beneath the drive pulley 43. Plate 49 can be adjustably mounted with respect to the lower edge 31 of sidewall 28 in order to adjust tension in endless loop belt 42. Belt 42 extends from idler pulley 47 to the roller pulley of the extreme end roller 32A and passes around and over the top of the roller pulley of end roller 32A. Belt 42 extends under and engages the next adjacent roller pulley, then alternately over and under adjacent roller pullies of the rollers until the opposite end pulley is reached. When belt 42 is driven, adjacent rollers are rotated in opposite directions giving rise to the pairs of counterrotating rollers.

Belt 42 is driven by a chain and sprocket power transmission. A first sprocket 50 is secured to the shaft 45 of roller belt drive pulley 43. A second sprocket 51 is secured to a shaft 52 rotatably mounted on a plate 53 depending from opposite sidewall 29 of table 20. A chain 55 is trained between the first and second sprockets 50, 51. A tension adjusting sprocket 56 is rotatably mounted on an arm 57 which extends from the frame of table 20. Tension adjusting sprocket 56 is in engagement with the drive chain 55 and is moveably mounted on the arm 57 so as to take up or relieve tension on the chain 55.

Second sprocket 51 is driven by hydraulic motor 59 through a universal linkage assembly 60. One end 61A of an adjustable link is equipped with a first universal coupling 63 which is connected to the second sprocket 51. The outer end 61B of the adjustable link is telescopically engaged in the first end 61A and has an end equipped with a second universal coupling 64. Motor 59 is located on a stand 65 and has an output shaft 66. A chain and sprocket assembly 68 connects the output shaft 66 to an intermediate shaft 69 carried by bearings 70 mounted on a plate 71 and held on a column 73 fixed to the stand 65. Intermediate shaft 69 is connected at its opposite end to the second universal coupling 64 whereby the operation of the motor 59 results in rotation of the second sprocket 51 with the result of counterrotation of the rollers 32, 33 of cleaning table 20. Universal linkage assembly 60 is extendable and retractable and, by virtue of the universal coupling 63, 64 it is operable at selected angular orientations.

Figures 5, 6, 7, 8, 9:
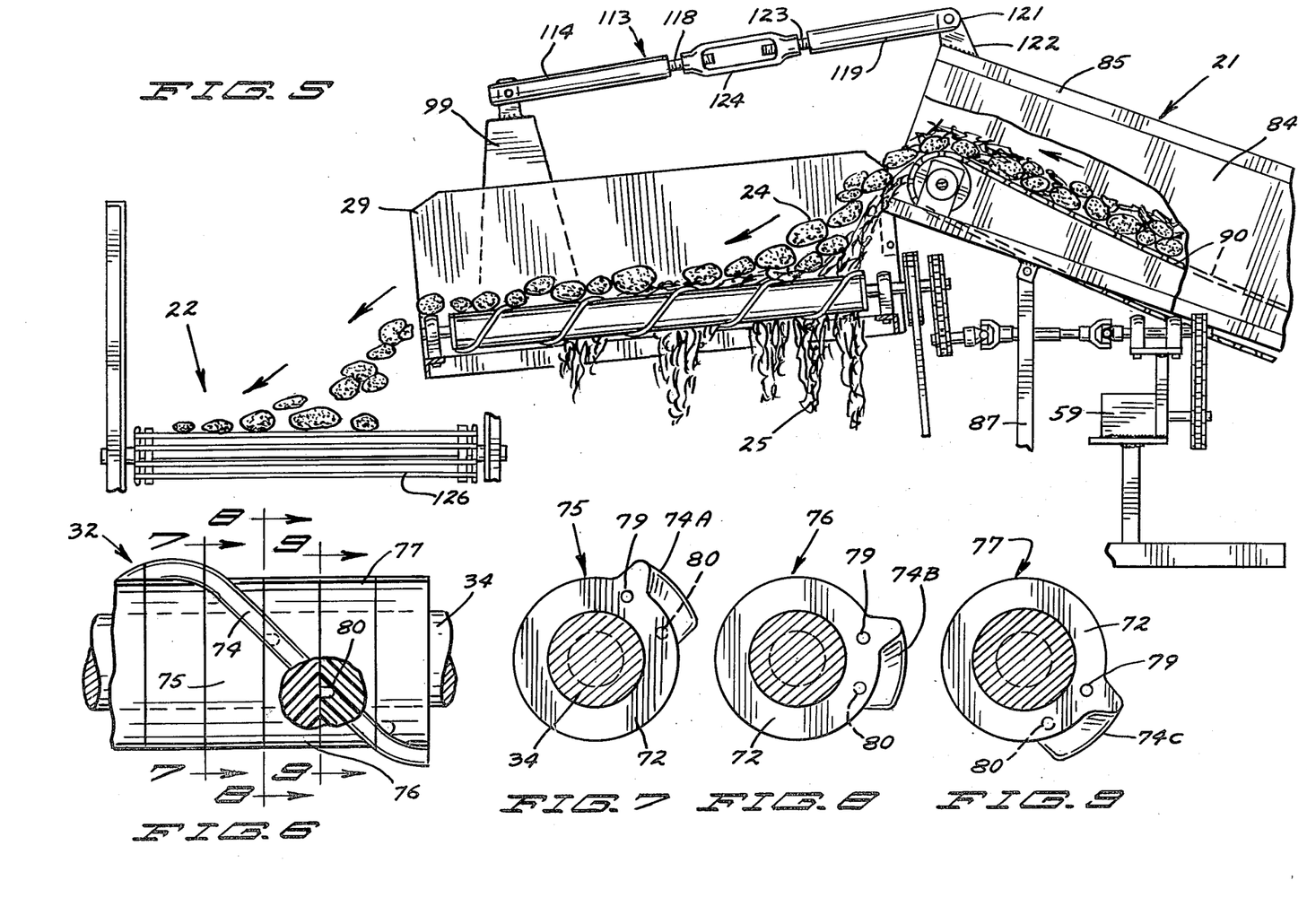
FIG. 5 is a side elevational view in section of the cleaning table of the invention shown operative to clean potatoes.
FIG. 6 is an enlarged view of a portion of one of the rollers of the cleaning table of FIG. 1 with a portion broken away for purposes of illustration.
FIG. 7 is a sectional view of a portion of the roller of FIG. 6 taken along the line 7—7 thereof.
FIG. 8 is a sectional view of a portion of the roller of FIG. 6 taken along the line 8—8 thereof.
FIG. 9 is a sectional view of a portion of the roller of FIG. 6 taken along the line 9—9 thereof.

The cleaning table rollers 32, 33 are comprised of a soft, resilient elastically deformable material such as rubber or plastic or the like having a durometer value between forty and fifty-five. The first roller 32 of each pair includes an elongate helical or spiral rib 74 extended from end to end wound about the cylindrical roller surface or body portion 72. The helical rib is comprised of the same resilient material as the body and can be integrally formed with the body of the roller. As shown, the cylindrical roller surface or body of the second roller 33 is smooth. A particular construction of the spiral roller 32 is shown in FIGS. 6 through 9 where a portion of a first roller 32 is shown in FIG. 6. Roller 32 is comprised of a plurality of roller segments shown to include the segments 75, 76 and 77 assembled on the roller shaft 34. Each of the segments has a central opening to be slip-fitted on the roller shaft 34. Each segment is cylindrical and carries a fragmented helical rib portion 74A, 74B, 74C along its surface. In assembled relationship, the helical rib segment portions 74A, 74B, 74C are aligned to form a continuous helical rib 74. Each roller segment has a circular opening 79 on one surface thereof, and an outwardly extended projection or finger 80 on the opposite surface. The openings 79 and fingers 80 are so positioned such that the finger 80 of one segment 75 is insertable in the opening 79 of the next segment 76 with the helical segment portions 74A in proper alignment.

Figure 10:
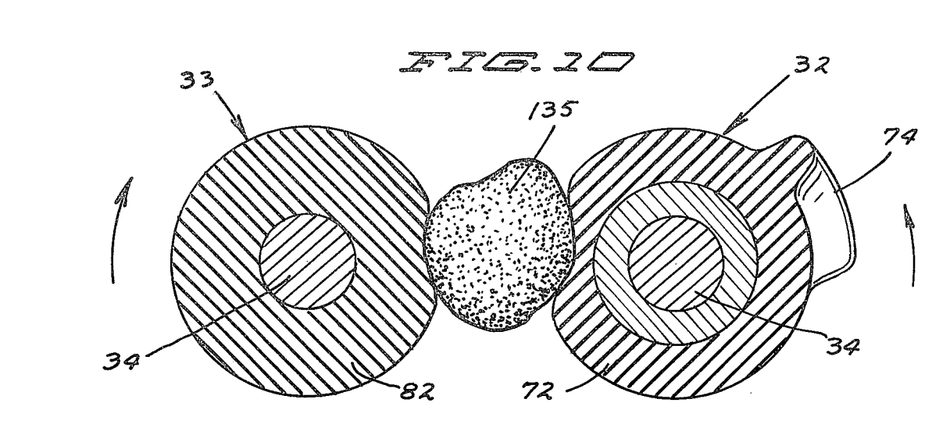
FIG. 10 is an enlarged sectional view of a portion of a pair of rollers shown in FIG. 3 taken along the line 10—10 of FIG. 3.

As shown in FIGS. 3 and 10 the second roller 33 of each roller pair has a cylindrical body portion 80 with a central opening for accommodation of the roller shaft 34. Body portion 82 is formed of a soft, resilient elastically deformable material such as rubber or plastic. The body portion 82 can also be formed of a plurality of cylindrical segments assembled together on the roller shaft 34. End caps 83 are provided on the roller shaft 34 at the ends of the body portion 82 to hold the roller body portion in place.

As shown in FIGS. 1, 2, 4 and 5, cleaning table 20 is adjustably assembled to the discharge end of input conveyor or elevator 21. Input conveyor 21 includes a housing having sidewalls 84 connected between a top wall 85 and bottom wall 86. The housing is supported at an inclination on a leg 87 attached to a boss 89 fixed to the bottom wall 86. A conveyor belt 90 is disposed within the housing of the input conveyor 21 and driven in conventional fashion by a motor 91 to carry potatoes 24 to and through the output end of the conveyor.

A pair of brackets 93A, B pivotally connect cleaning table 20 to the discharge end of input conveyor 21. As shown in FIG. 4, the upper end of an elongate bracket 93A is fastened to sidewall 84 of input conveyor 21 by a pair of fasteners such as bolts 94A. The lower end of bracket 93A extends rearwardly and downwardly, and is connected to the sidewall 28 of cleaning table 10 by a pivotal connection such as a bolt 95A. The upper end of the opposite bracket 93B is connected by a pair of fasteners such as bolts 94B to the opposite sidewall 84 of cleaning table 10. The lower end of bracket 93B is pivotally connected to the opposite sidewall 29 of cleaning table 10 by a pivotal connection such as a bolt 95B in axial alignment with the first bolt 95A to pivotally connect the cleaning table 20 to the end of input conveyor 21.

Cleaning table 20 is further connected to input conveyor 21 by adjustable linkage means shown to include a first turn-buckle assembly 97 (FIGS. 1 and 4). A first side plate 98 extends upwardly along the first sidewall 28 of table 20. The base of side plate 98 is located in and rests in the open channel of the lower edge 31 of sidewall 28. Side plate 98 extends beyond the upper edge of sidewall 28. A second side plate 99 is similarily positioned with respect to the second sidewall 20 of cleaning table 20. A transverse bar or brace 101 extends laterally across the top of cleaning table 20 and is connected at either end to the upper ends of the side plates 98, 99 (See FIG. 4).

Turnbuckle assembly 97 includes a first bar 102 having a clevis end 103 pivotally connected to an ear 104 fixed to brace 101. The opposite end 106 of first bar 102 is reduced in diameter and is threaded. A second arm 107 has a clevis end 108 pivotally connected to a lug 109 fixed at the end of input conveyor 21 on top wall 85. The opposite end 111 of second bar 107 is reduced in diameter and is threaded oppositely to the end 106 of first bar 102. A turnbuckle yoke 112 engages the threaded ends 106, 111 of the first and second bars 102, 107. Rotation of the turnbuckle yoke 112 is effective either to move the bars 102, 107 toward one another or away from one another.

A second turnbuckle assembly 113 is provided to assist in holding cleaning table 20 with respect to output conveyor 21 and is identical in construction to the first turnbuckle assembly 97 (See FIG. 5). Second turnbuckle assembly 113 is located laterally opposite the first turnbuckle assembly 97 with respect to the deck of cleaning table 20 and includes a first bar or rod 114 having a clevis end 116 in pivotal engagement with an ear 117 which is securely fixed to the transverse brace 101. The opposite end 118 of first bar 114 is reduced in diameter and is threaded. A second bar 119 has a clevis end 121 in pivotal engagement with a lug 122 fixed to the top wall 85 of the housing of input conveyor 21. The opposite end 123 of second bar 119 is reduced in diameter and is threaded oppositely to that of the end 118 of first bar 104. A turnbuckle yoke 124 threadably engages both threaded 118, 123 of first and second bars 114, 119. Rotation of the turnbuckle yoke 124 is effective to draw together or move apart the first and second bar 114, 119. The turnbuckle yoke 124 of second turnbuckle assembly 113 and turnbuckle yoke 112 of first turnbuckle assembly 97 are rotated simultaneously to move the respective bars together or apart and pivotally move the cleaning table 20 with respect to the end of input conveyor 21. Such adjustment of the turnbuckle assemblies permits angular adjustment of the forward inclination of the rollers of cleaning table 20 as between positions shown in FIG. 1 and FIG. 5.

The deck of cleaning table 20 formed by the pairs of rollers 32, 33 discharges potatoes onto the output conveyor or spud chain conveyor 22 for movement of potatoes to a place of packing or storage. Output conveyor 22 is of conventional construction having a conveyor comprised of a plurality of transverse rods 126 interconnected and driven by an electric motor 127 and supported by legs 128.

As shown in FIG. 5, in use of the cleaning table of the invention, freshly dug potatoes 24 together with associated debris 25 are delivered to the belt 90 on input conveyor 21. Turnbuckle assemblies 97, 113 are used to adjust the inclination of the rollers of table 20 according to the type and nature of debris associated with the potatoes 24. The spacing between the rollers of each pair or set is adjusted according to the size of small potatoes to be eliminated. If the rollers are set close enough so that the pitch angle of the roller pair, or that space between the rollers which will result in an object wedging between then upon counterrotation, is less than the diameter of the smallest potato, then no potatoes will be eliminated. If small potatoes are to be eliminated, then the pitch angle, or spacing between the rollers, is increased and the small potatoes pass between the rollers with the trash.

Motor 57 is operated to drive the rollers with a surface velocity preferable between 200 ft. (61 m.) per minute and 450 ft. (137 m.) per minute. Potatoes and associated debris are discharged upon the rearward ends of the rollers 32, 33. The inclination of the table and helical spiral of the first rollers 32 cause movement of potatoes along the table. Dirt, clods of dirt, weeds, vines, and trash are removed from the potatoes and fall between the rollers. The rollers gently pass the potatoes without damage and discharge them off the end. Due to the resiliency of the rollers, the potatoes are moved to an elevation above the debris and quickly move over the rollers at a level higher than the dirt and trash and permit the dirt and trash to be captured by the rollers. The resilient material of the rollers also aids through its high friction coefficient in breaking up and pulling through the weeds, vines, trash, dirt and clods. As shown in FIG. 10, when a stone 135, or other hard material is introduced to the cleaning roller set and, if its size falls within the pitch angle of the rollers, rather than jamming the mechanism and causing stalling and possible damage, the resilient material compresses and permits the hardened material to be sorted with the trash, vines, dirt and the like. The resilient rollers are soft and prevent damage to the potatoes. The durometer value of the roller body can be between 40 and 55. Since the surface velocity of the rollers generates high inertia, the power requirement is less when a hard object is compressed between the rollers as it passes through. The centrifugal force of the rollers at the given velocity prevents wet dirt from clinging to the rollers and causing operational problems.

The pitch of the helical rib of the first roller is related to the volume of dirt and trash to be removed from volume of potatoes to be cleaned. For example, if the volume of dirt, clods, trash and the like is high as compared to the volume of potatoes, the pitch will be smaller than when the volume of dirt, clods, trash and the like is low compared to the volume of potatoes. The helical rib, as it passes a dirt clod, breaks a piece from the clod with the broken piece passing between the rollers. The clod is broken again as the helical rib passes and so on until the clod is smaller than the pitch angle of the rollers and passes between the rollers. The helical rib serves to move the potatoes longitudinally across the table. While the trash, dirt, rocks, clods and the like are also moved by the helical rib, these different materials are moved slower than the potatoes and tend to remain close to the rollers, which greatly increases the opportunity for them to be captured by the rollers and discharged from the table. The pitch of the helical rib can, for example, be between one revolution in 20 inches of axial length to one revolution in 3 inches of axial length of the roller.

As shown in FIG. 3, the second roller of each pair of rollers has a smooth outer surface. The second roller of each set of rollers could be comprised of another roller with a helical rib to remove exceedingly high volumes of dirt, vines and the like as compared to the volume of potatoes with a corresponding loss of some small potatoes. The second roller could also be comprised as a roller like the roller segment as shown in FIG. 11. A roller segment 130 has a central axial roller shaft 131 and a generally cylindrical body portion 132. Body portion 132 is formed of a soft, resilient material such as rubber. A plurality of longitudinal, parallel spaced apart straight ribs 134 are formed along the circumference of the body portion 132 and extend from end to end along the length of the roller. The ribbed roller 130 is effective in the removal of heavy volumes of dirt when required with only the loss of a few small potatoes.

Figure 12:
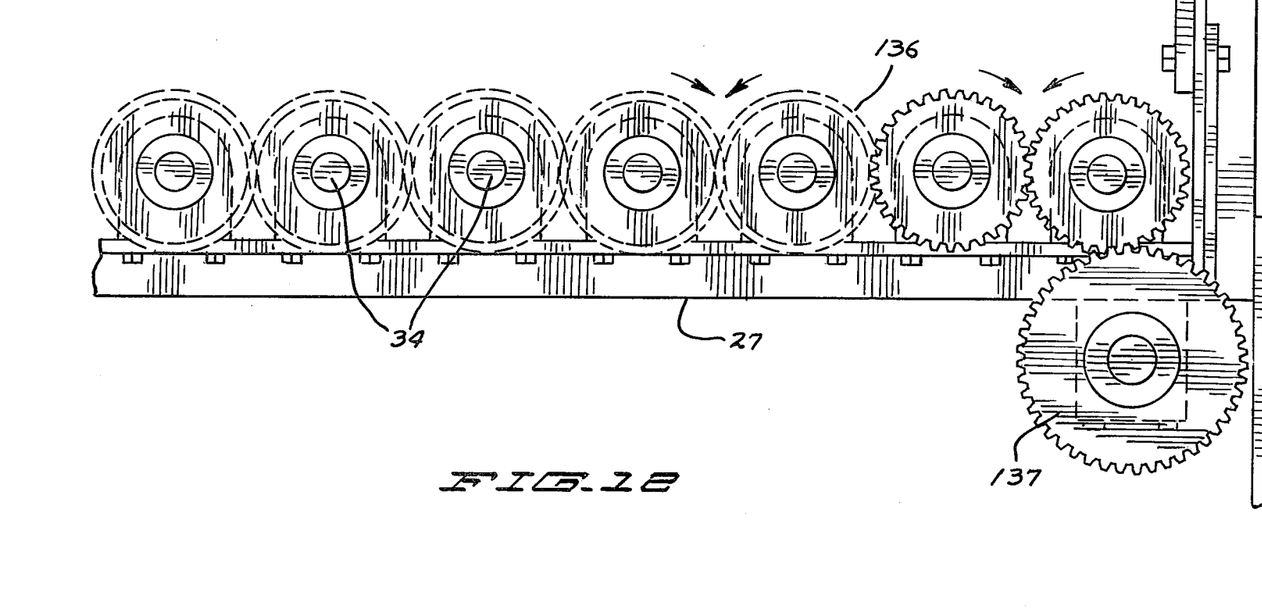
FIG. 12 is an end elevational view of a cleaning table showing an alternative roller drive assembly.

An alternative means of driving the pairs of rollers in counterrotating relationship is illustrated in FIG. 12. The ends of roller shafts 34 extended rearwardly beyond rearward frame member 27 are equipped with circular spur gears 136 with each gear in meshing engagement with gears on either side. A power gear 137 is in engagement with an end gear 136. Power gear 137 is driven by a suitable source (not shown) as a hydraulic motor or the like. Power gear 137 drives the end gear 136 with resultant counterrotation of adjacent gears and resultant opposite rotation of rollers of each pair.

While there has been shown and described certain preferred embodiments of the invention, it will be apparent to those skilled in the art that deviations and changes may be had from the embodiment shown in and described without departing from the scope and spirit of the invention.

The embodiments of the invention in which an exclusive property or privilege is claimed are defined as follows:

1. A cleaning table assembly for separating newly harvested vegetables from associated debris, comprising:
  a cleaning table having a deck inclined from a first end downward toward a second end including a plurality of parallel spaced apart cleaning rollers assembled in generally coplanar relationship, and means for rotation of the rollers;
  conveyor means having a material discharge end poised over the first end of the cleaning table deck for discharge of vegetables and associated debris onto the cleaning table deck proximate the first end thereof for discharge of the vegetables from the cleaning table deck off of the second end thereof;
  connecting means connecting the cleaning table to the conveyor means, said connecting means including pivot means pivotally connecting a first portion of the conveyor means proximate the discharge end to a first portion of the cleaning table, and adjustable linkage means connected between a second portion of the conveyor means upwardly spaced from the first portion and a second portion of the cleaning table upwardly spaced from the first portion whereby the inclination of the cleaning table deck is adjustable by adjustment of the adjustable linkage means.

2. The cleaning table assembly of claim 1 wherein:
  said adjustable linkage means includes a turnbuckle assembly.

3. The cleaning table assembly of claim 1 wherein:
  said adjustable linkage means includes a pair of parallel turnbuckle assemblies.

4. The cleaning table assembly of claim 1 including:
  a frame, said rollers being mounted on said frame in pairs of first and second rollers for counterrotation toward one another when viewed from an upper side, each said roller having roller support means mounted to said frame, and a generally cylindrical outer roller body portion composed of an elastically deformable resilient material, the first roller of each pair having a helical rib extending from end to end of the body portion, said means for rotation of the rollers comprising means for counterrotation of said rollers.

5. The cleaning table assembly of claim 4 wherein:
  the body portion of the second roller of each roller pair has a smooth outer surface.

6. The cleaning table assembly of claim 4 wherein:
  the body portion of the second roller of each roller pair has a plurality of longitudinal, straight ribs.

7. The cleaning table assembly of claim 4 wherein:
  the body portion of the second roller of each roller pair has a helical rib extending from end to end.

8. The cleaning table assembly of claim 1 wherein:
  said pivot means includes a pair of brackets each secured at one end to the conveyor means and pivotally connected at the opposite end to the cleaning table proximate the first end, said adjustable link means including a turnbuckle assembly.

9. The cleaning table assembly of claim 8 wherein:
  a frame, said rollers being mounted on said frame in pairs of first and second rollers for counterrotation toward one another when viewed from the upper side, each side rollers having roller support means mounted to said frame, and a generally cylindrical outer roller body portion composed of an elastically deformable resilient material, the first roller of each pair having a helical rib extending from end to end of the body portion, said means for rotation of the rollers comprising means for counterrotation of said rollers.

10. The cleaning table assembly of claim 9 wherein:
  the body portion of the second roller of each roller pair has a smooth outer surface.

11. The cleaning table assembly of claim 9 wherein:
  the body portion of the second roller of each roller pair has a plurality of longitudinal, straight ribs.

12. The cleaning table assembly of claim 9 wherein:
  the body portion of the second roller of each roller pair has a helical rib extending from end to end.

13. A cleaning table assembly for separating newly harvested vegetables from associated debris, comprising:
  a cleaning table having an inclined deck including a plurality of parallel spaced apart cleaning rollers assembled in generally coplanar relationship, and means for rotation of the rollers, a frame having longitudinal side members and a forward transverse member and a rearward transverse member, said rollers being connected between the forward and rearward transverse frame members parallel to the longitudinal side frame members, a first side plate extending upward from a first of said longitudinal side frame members, a second side plate extending upward from a second of said longitudinal side frame members, a transverse brace extending laterally across the top of the frame and connecting the first and second side frame members;
  conveyor means having a conveyor means housing, and a material discharge end for discharge of vegetables and associated debris onto the cleaning table deck proximate a first end thereof for discharge of the vegetables from the cleaning table deck off of a second end thereof with the deck inclined downwardly from the first end toward the second end;
  connecting means connecting the cleaning table to the conveyor means with said discharge end of the conveyor means poised over the first end of the cleaning table deck, said connecting means including pivot means pivotally connecting a portion of the conveyor means to a portion of the cleaning table, and adjustable linkage means comprising a first turnbuckle assembly connected to said transverse brace at one end and connected to the conveyor means housing at the other end, a second turnbuckle assembly connected to the transverse brace at one end and connected to the conveyor means housing at the opposite end, said pivot means including a pair of brackets each secured at one end to the conveyor means housing and pivotally connected at the opposite end to the cleaning table proximate the first end thereof whereby the inclination of the cleaning table deck is adjustable by adjustment of the adjustable linkage means.

14. The cleaning table assembly of claim 13 wherein: a frame, said rollers being mounted on said frame in pairs of first and second rollers for counterrotation toward one another when viewed from the upper side, each said roller having roller support means mounted to said frame, and a generally cylindrical outer roller body portion composed of an elastically deformable resilient material, the first roller of each pair having a helical rib extending from end to end of the body portion, said means for rotation of the rollers comprising means for counterrotation of said rollers.

* * * * *